United States Patent [19]

Bosco

[11] Patent Number: 4,459,761

[45] Date of Patent: Jul. 17, 1984

[54] RETRACTABLE PLUMB AND CHALK LINE

[76] Inventor: John J. Bosco, West Nyack, N.Y. 10994

[21] Appl. No.: 457,052

[22] Filed: Jan. 10, 1983

[51] Int. Cl.³ .......................... B44D 3/38; G01C 15/10
[52] U.S. Cl. ........................................ 33/414; 33/393
[58] Field of Search ................... 33/414, 392, 393, 394

[56] References Cited

U.S. PATENT DOCUMENTS

| 1,586,654 | 6/1926 | Conway | 33/393 X |
| 1,928,377 | 9/1933 | Hobbs | 33/138 X |
| 2,779,045 | 1/1957 | Harvey | 33/393 X |
| 3,011,263 | 12/1961 | Unger | 33/393 X |
| 3,016,616 | 1/1962 | Matson | 33/393 X |
| 3,442,025 | 5/1969 | Mathiesen | 33/393 X |

Primary Examiner—Harry N. Haroian

Attorney, Agent, or Firm—Hopgood, Calimafde, Kalil, Blaustein & Judlowe

[57] ABSTRACT

The invention contemplates a plumb-indicating and marking tool whereby marking a plumb line on a wall or other structure is a simple one-handed operation, so that the user, who may be in an otherwise precarious position on a ladder, may have one hand free at all times to assure his own personal safety. A casing encloses a reeled chalk line as well as a plumb bob connected to the chalk line, and the reel may be releasably locked for the retracted or for any desired line pay-out condition. Provision is made for fastening the casing to the user's belt, in upside-down condition, whereby selection of payout length is readily accomplished and chalk-dusting of the line is automatic.

13 Claims, 6 Drawing Figures

FIG. 1.  FIG. 2.  FIG. 3.
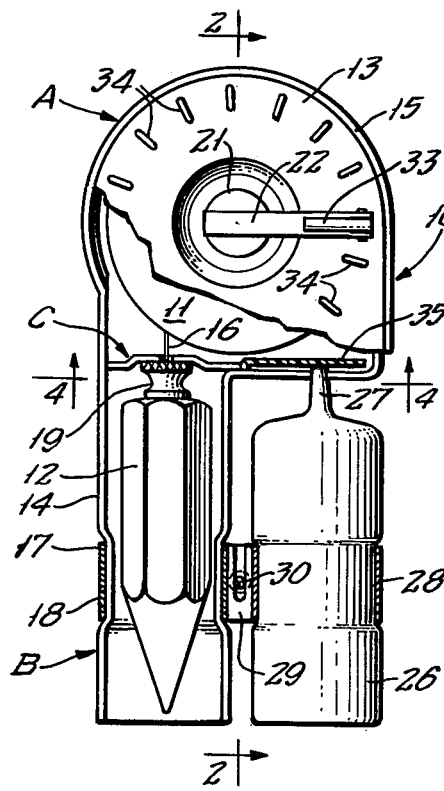
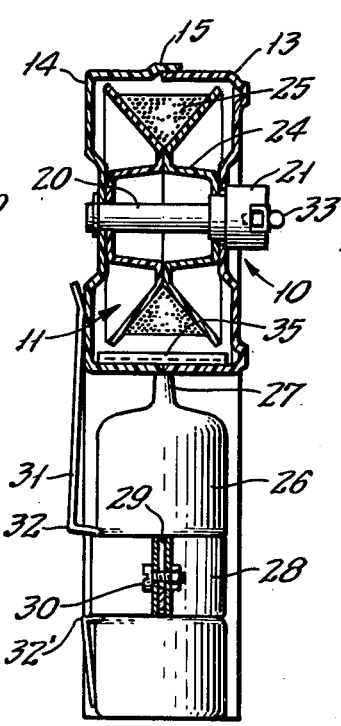
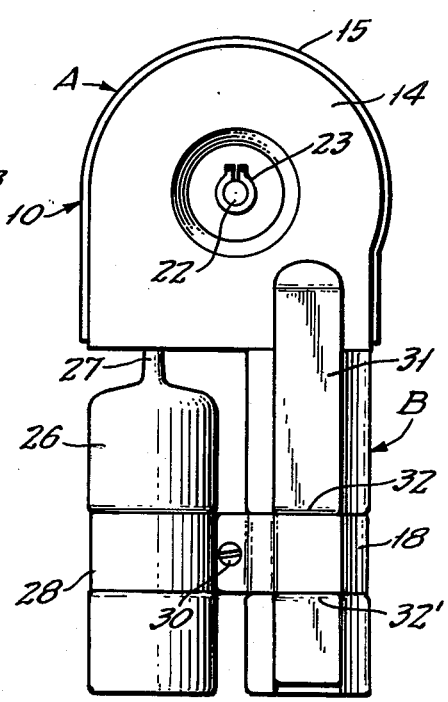
FIG. 4.
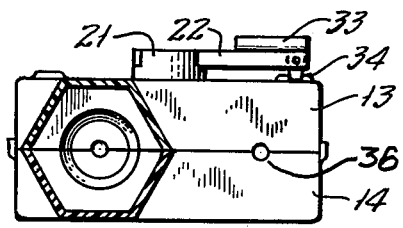
FIG. 5.
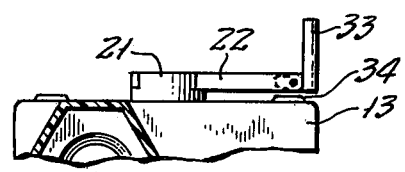
FIG. 6.
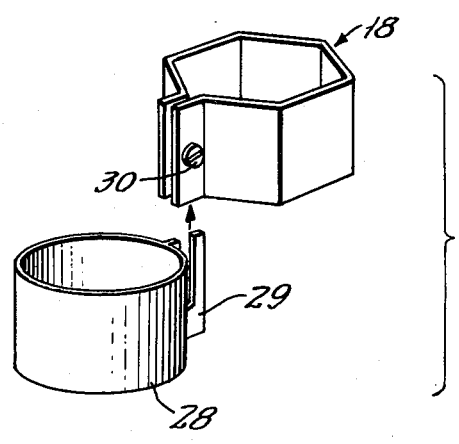

RETRACTABLE PLUMB AND CHALK LINE

BACKGROUND OF THE INVENTION

The invention relates to plumb-indicating and chalk-line devices and in particular to a single instrumentality in which features of both of these kinds of device are incorporated.

The conventional plumb-measuring device comprises a plumb bob to one end of which a length of suspension line is connected. Operational use requires at least two hands and/or twice climbing a ladder, and free line can become entangled after use. Even if one were to attempt combining a plumb bob with a conventional chalk line, as by attaching the same to the free end of line payed out from its reel and container, there is again the same problem requiring two hands to establish and mark the vertical established by the plumb action. There is, to my knowledge, no single device which will enable establishment and marking of a plumbed vertical alignment, in a one-handed operation.

BRIEF STATEMENT OF THE INVENTION

It is an object of the invention to provide an improved device of the character indicated whereby a plumbed alignment can be established and marked in a one-handed operation, thus materially enhancing the safety of operations from relatively precarious elevated locations.

The invention achieves this object in a unitary device in which a plumb bob is stowed when retracted and not in use, in which reeled chalk line in a casing controls the extent of plumb bob displacement out of its stored position, and in which selectively operable brake operation is available to lock and retain a selected pay out of the plumb bob on its chalk line. Provision is made for mounting a bottle of chalk powder to the device, such that in normal plumb-bob use, the chalk line is automatically supplied with chalk powder, and such that when not in use the device may stand in a position in which chalk-dispension cannot occur.

DETAILED DESCRIPTION

The invention will be described in detail in conjunction with the accompanying drawings, in which:

FIG. 1 is a view in elevation of a combined plumb and chalk line of the invention, portions of the casing being broken-away and in section to reveal internal detail;

FIG. 2 is a sectional view taken at 2—2 in FIG. 1;

FIG. 3 is a view in elevation to show the side opposed from that of FIG. 1;

FIGS. 4 and 5 are similar fragmentary views, taken from the aspect 4—4 of FIG. 1, to show selected states of parts of FIGS. 1 to 3; and FIG. 6 is an exploded view in perspective to show a feature of the device of FIGS. 1 to 3.

In the drawings, a two-piece casing 10 includes a first substantially fully closed portion A in which a reel 11 is journaled for rotation, and a tubular-wall portion B within which a plumb bob 12 is received when in its fully retracted position. The two pieces 13–14 of casing 10 appear in both FIGS. 1 and 2 and are seen to be mating halves, each accounting for half of each of the portions A-B, and seen in FIG. 2 to be in retained fitted relation via telescoped lap of the flanged periphery 15 of piece 14, over the corresponding peripheral edge of piece 13. The tubular-wall portion B extends substantially tangential to the pay-out direction of a chalk line 16 connected to plumb bob 12 and wound upon reel 11, and a partition wall C substantially closes the inner volume of the reel-storing portion A of casing 10, from the open-ended volume of the tubular-wall portion B; such closure between portions A-B is complete except for a small central aperture in the partition wall C, via which aperture line 16 is guided in its pay out and retraction of plumb bob 12.

Preferably, for a plumb bob 12 of polygonal body section (as shown), the inner contouring of tubular wall portion B is correspondingly polygonal, for clearance with bob 12 and also for anti-rotational keyed engagement therewith, particularly at a necked-down region 17 for located support of an externally clamped retaining strap 18. At its inner end, the plumb boss 19 by which line 16 is connected to bob 12 is nested in a recessed region of partition C when in retracted position, thereby stabilizing the retracted position of bob 12.

Within the A portion of casing 10, reel 11 is supported for rotation on its crankshaft 20, which is journaled at spaced locations, afforded by journal apertures in the respective casing halves 13–14. Shaft 20 is fast to a boss 21 and crank arm 22 at one end, and a snap ring 23 retains the other end of shaft 20 to casing piece 14. Reel 11 comprises two like halves, permanently secured to each other and to shaft 20, and contoured to define a central hub 24 and an outwardly open periphery groove 25 of V-shaped section; wound chalk line 16 is accommodated as multiple turns in the V-section groove 25.

The tangential orientation and location of casing portion B with respect to portion A is such as to provide convenient access to space alongside portion B, and this space is advantageously devoted to removable accommodation of a bottle 26 of chalk powder. Bottle 26 is suitablly of squeezable plastic, such as polyethylene, and has a dispensing nozzle 27, shown entered into another small aperture 36 in the otherwise fully enclosed volume within casing portion A. Preferably, a supporting hoop member 28 (FIG. 6) has sufficiently tight interference fit with the body of bottle 26 to assure bottle retention in normal use, and hoop member 28 has an integrally formed hook arm 29 removably engageable between clamp ends of strap 18, as suggested by a vertical arrow in FIG. 6. Once thus assembled, a clamp bolt 30 is tightened to retain bottle 26 in its position of nozzle engagement to the powder-entrance aperture 36 of casing portion A. As best seen in FIGS. 2 and 3, the setting of clamp strap 18 longitudinally locates between spaced shoulders 32-32' of a belt clip 31, which extends vertically on the casing side which is visible in FIG. 3. Belt clip 31 is shown to be upwardly openable, in that it is intended that the entire described structure shall be inverted, when in normal use, as will later be made clear. In other words, it is intended that the described structure be inverted, and that belt clip 31 be applied to engage over the user's belt, in the course of downward displacement, to the point of stop reference against the inner surface of shoulder formation 32.

Returning once more to reel 11 and its crank means 20-21-22, it is a feature of the invention that brake action shall be selectively available to lock and retain a selected line (16) pay out of bob 12. In the form shown, this is accomplished by selectively operable means coacting between the outer end of arm 22 and adjacent casing (10) area swept by rotation of arm 22. More specifically, a bellcrank member 33 having pivoted connection to the outer end of arm 22 is actuable between a retracted position (FIG. 4) and an extended position (FIG. 5). In the extended position (FIG. 5), one arm of bellcrank 33 becomes the handle for convenient driving actuation of the reel crank 22; in this extended position, bellcrank 33 and all parts of crank arm 22 clear the nearest limits of an angularly spaced succession of dog-engagement lug locations, lugs 34 at these locations being characterized by integral outer-surface formations of casing piece 13. In the retracted (FIG. 4) position of bellcrank 14, its "handle"-function arm is retracted alongside crank arm 22 but its other arm has dog engagement between adjacent lugs 34, to prevent reel rotation out of the thus-locked position.

In use, and once loaded to permit chalk powder from bottle 26 to enter the substantially closed volume with casing portion A, the described device is clipped, upside-down with respect to FIGS. 1 to 3, to the belt of the user. Normally, bellcrank 33 will be in handle-retracted reel-dogging position (FIG. 4). To condition the device for plumb-marking use, bellcrank 33 should be actuated to its FIG. 5 position, to free reel 11 for rotation sufficient for removal and holding of bob 12 outside of tubular wall portion B. From an elevated position, as from a ladder position, line 16 should be released to an extent sufficient to permit the user to grasp line 16 and to suspend bob 12 from a desired height and vertical offset. This can be done without concern for casing 10, since the latter is belt-retained, in inverted condition, and since an upward reach is needed to the suspension point. The thumb and forefinger of one hand are the only necessary digits for holding line 16 to the suspension point, as to a line of wall/ceiling intersection, thus enabling one of the other fingers of the same hand to deflect and snap chalk-laden line 16, for correctly marking the wall. The operation can be repeated for as many vertical markings as may be needed, whereupon by rotating crank 22 via its handle (bellcrank 33 in its FIG. 5 position), reel 11 can rewind line 16 to the point of fully retracting all line 16, and plumb bob 12 into casing portion B. This retracted condition is then locked, by folding down the handle end of bellcrank 33, to thus dog the other arm of the bellcrank between adjacent lugs 34.

It will be seen that the described device meets the stated object and that no more than a single hand is needed, in order to vertically mark a wall or other structure for a plumb alignment. The device may gravitationally dispense sufficient chalk powder into the region of line on reel 11, or more can be added, by gently squeezing bottle 26, while belt retained. In any event, when stored in upright position, i.e., with the outer open end of casing portion B and the bottom of bottle 26 resting on a horizontal shelf or other surface, there can be no tendency to lose powder, in that both the line aperture and the nozzle aperture in casing 10 are effectively closed by line 16 and boss 19 on the one hand, and by nozzle 27 on the other hand. And the simple wind and lock mechanism assures against uncontrolled strewing of line. More importantly, proper use of the device enhances safety by never requiring use of more than one hand while in a precarious position.

While the invention has been described in detail, it will be seen that modifications may be made without departing from the scope of the invention. For example, the hook slot by which band 28 is removably secured to clamped ends of strap 18 affords a measure of longitudinal adjustability in positioning the bottle 26 and its nozzle 27 with respect to the casing aperture. Use may be made of such longitudinal adjustability to operate an inside flap or check valve 35, compliantly integral with one of the casing halves (13-14) and governing admission of powder to reeled line 16; release of the clamp allows retraction of nozzle 27 and would thus permit check-valve closure of the powder-entry aperture. Such an arrangement will be of convenience to the user who chooses not to carry a bottle 26 in constant assembly to the plumb and its reel-associated structure, in that powder-filling can be a separate operation, whatever the bottle size or shape, if so desired.

What is claimed is:

1. In combination, a casing, a reel mounted for rotation within said casing and externally accessible crank means for actuating said reel, said casing being characterized by a generally tubular open-ended wall on an axis substantially tangential to said reel, a plumb bob sized for reception via the open end of said tubular wall, a chalk line wound upon said reel and connected at its free end to said plumb bob, and selectively operable brake means for retaining a selected wound-line position of said reel in said casing; said casing having a chalk-admission opening for receipt of chalk powder, and including an inner wall member substantially closing the inner end of said tubular wall, said inner wall member having a limited generally central aperture through which line from said reel passes to said plumb bob, whereby chalk powder within said casing and on the inner side of said inner wall may be substantially confined for exposure to line within said casing; said chalk-admission opening being on the side of said casing from which said tubular wall is open, and said chalk-admission opening being laterally offset from said tubular wall, and valve means at said opening, whereby chalk can be retained in said casing and further such chalk may be supplied thereto when said tubular wall is upwardly open.

2. The combination of claim 1, in which the effective longitudinal extent of said tubular wall fully accommodates the longitudinal extent of said plumb bob, when retracted therein.

3. The combination of claim 1, in which said brake means comprises coating elements of said crank means and said casing.

4. The combination of claim 3, in which said coacting elements include a manually operable dog carried at a radially outer exposed part of said crank means; said casing, in the region adjacent to and swept upon crank rotation, having plural angularly spaced dog-receiving formations.

5. The combination of claim 1, in which said casing comprises mating fitted half casings, each of which provides a separate one of two spaced journal supports for said reel and crank means.

6. The combination of claim 5, in which said half casings each integrally include an outer-tubular wall half.

7. The combination of claim 1, in which said plumb bob has a body of polygonal section and in which the inner surface of said tubular wall is of like polygonal section and is sized for clearance with the plumb and for keyed anti-rotational retracted accommodation of the plumb.

8. In combination, a casing, a reel mounted for rotation within said casing and externally accessible crank means for actuating said reel, said casing being characterized by a generally tubular open-ended wall on an axis substantially tangential to said reel, a plumb bob sized for reception via the open end of said tubular wall, a chalk line wound upon said reel and connected at its free end to said plumb bob, and selectively operable brake means for retaining a selected wound-line position of said reel in said casing; said casing having a chalk-admission opening and including an inner wall member substantially closing the inner end of said tubular wall, said inner wall member having a limited generally central aperture through which line from said reel passes to said plumb bob, whereby chalk powder within said casing and on the inner side of said inner wall may be substantially confined for exposure to line within said casing; and a chalk-dispensing bottle having a nozzle fitted to said opening and removably retained to said casing alongside said generally tubular wall.

9. The combination of claim 3, in which a belt clip is carried by said casing.

10. The combination of claim 4, in which the orientation of said belt clip is such as to fit over and gravitationally support said casing via belt engagement when the open end of said tubular wall is upwardly open and when said bottle is inverted, for chalk discharge upon reel-wound line within said casing.

11. The combination of claim 3, in which the effective longitudinal extent of said tubular wall fully accommodates the longitudinal extent of said plumb bob, when retracted therein; said longitudinal extent being so matched to the longitudinal extent of the fitted and retained bottle that said combination may stand on a horizontal surface, via the outer open end of said tubular wall and the bottom of said bottle.

12. The combination of claim 3, in which said reel comprises a hub having a radially outwardly divergent peripheral groove of generally V-section, said line being wound in said groove and the chalk-admission opening being substantially in the radial plane which is central to said V-section.

13. In combination, a casing, a reel mounted for rotation within said casing and externally accessible crank means for actuating said reel, said casing being characterized by a generally tubular open-ended wall on an axis substantially tangential to said reel, a plumb bob sized for reception via the open end of said tubular wall, a chalk line wound upon said reel and connected at its free end to said plumb bob, and selectively operable brake means comprising coacting elements of said crank means and said casing for retaining a selected wound-line position of said reel in said casing; said coacting elements including a manually operable dog carried at a radially outer exposed part of said crank means, and said casing in the region adjacent to and swept by crank rotation having plural angularly spaced dog-receiving formations; said manually operable dog being one end of a bellcrank pivotally supported at the outer end of said crank, the other arm of said bellcrank being substantially flush with said crank when said one arm is in dogged engagement with one of said formations, and the said other arm of said bellcrank forming an outwardly extending handle for said crank when in the position of retraction from said dogged engagement.

* * * * *